United States Patent [19]

Jambor et al.

[11] Patent Number: 5,359,349
[45] Date of Patent: Oct. 25, 1994

[54] VDU WORKSTATION IN A VEHICLE

[75] Inventors: Arno Jambor, Vaihingen; Gerd Seidenfaden, Leonberg; Jürgen Mutschler, Sindelfingen; Wilhelm Seeger, Nagold, all of Fed. Rep. of Germany

[73] Assignee: Mercedes-Benz AG, Fed. Rep. of Germany

[21] Appl. No.: 643,938

[22] Filed: Jan. 22, 1991

[30] Foreign Application Priority Data

Jan. 19, 1990 [DE] Fed. Rep. of Germany ....... 4001448

[51] Int. Cl.⁵ .............................................. G09G 3/02
[52] U.S. Cl. .................... 345/168; 345/905; 248/918
[58] Field of Search .................... 341/21, 22; 297/146, 297/191; 312/7.2, 194; 248/917-924; 340/711; 358/254; 400/680; 345/168, 169, 156, 905

[56] References Cited

U.S. PATENT DOCUMENTS

| 4,584,603 | 4/1986 | Harrison | 340/988 |
|---|---|---|---|
| 4,647,980 | 3/1987 | Steventon et al. | 358/86 |
| 4,792,183 | 12/1988 | Townsend, III | 297/191 |
| 4,831,307 | 5/1989 | Takenaka et al. | 358/252 |
| 4,835,604 | 5/1989 | Kondo et al. | 358/254 |
| 4,973,176 | 11/1990 | Dietrich | 340/710 |
| 4,990,900 | 2/1991 | Kikuchi | 340/712 |
| 4,992,881 | 2/1991 | Tomasek et al. | 358/252 |
| 5,046,433 | 9/1991 | Kramer et al. | 297/191 |
| 5,055,839 | 10/1991 | Davis et al. | 341/22 |

FOREIGN PATENT DOCUMENTS 3806473  9/1989  Fed. Rep. of Germany.
WO8807460 10/1988  PCT Int'l Appl..

OTHER PUBLICATIONS

DE—Z: "Mercedes-Benz Intern." Patents Abstract of Japan—M-789 Jan. 25, 1989 vol. 13/No. 33.

Primary Examiner—Ulysses Weldon
Assistant Examiner—Doon Chow
Attorney, Agent, or Firm—Evenson, McKeown, Edwards & Lenahan

[57] ABSTRACT

A Video Display Unit ("VDU") workstation is matched to the specific safety requirements in a motor vehicle. In its working position, the configuration of the VDU workstation is adapted to be changed, in the event of an accident, by repositioning individual components in response to an impact-specific force in such a way that, inter alia, its extension in the longitudinal direction of the vehicle is reduced. When not in use, the VDU workstation can be lowered in a stowage recess of a supporting part mounted, for example in the back rest of a vehicle seat.

20 Claims, 2 Drawing Sheets

VDU WORKSTATION IN A VEHICLE

BACKGROUND AND SUMMARY OF THE INVENTION

The invention relates to a Video Display Unit ("VDU") in a vehicle.

A VDU workstation of the generic type, which enables a passenger to work on a VDU in a vehicle, is disclosed in DE-Z: "Mercedes-Benz internal publication", issue June, 1989, page 11, presented at the International Automobile Exhibition IAA 1989). For this purpose, a conventional lap top personal computer was mounted on a fold-out table on the rear side of the back rest of the front seat passenger, and is accessible from the corresponding rear seat. This solution, however, which builds on a known lap top personal computer and gives the impression of providing office equipment in a vehicle, does not provide protection of the passenger in the case of an impact due to an accident when such a VDU workstation is in the operating position. Because of the relatively large mass as well as the bulkiness of a conventionally designed lap top personal computer and of a fold-out table bearing or supporting it, impact with the computer and table due to an accident can cause serious injury to an unsuspecting user. In addition, such an arrangement requires a relatively large stowing depth e.g., in a back rest, as a result of which freedom of movement of legs or depth of upholstering in the back rest can be lost.

The object of the present invention is to provide a VDU workstation in a vehicle which is not bulky, requires little space in the area of a user, and is adapted to safety requirements in the vehicle.

This object is achieved according to the invention by a VDU workstation which has a base part of relatively short dimension in the direction of the user, having an operating part with keyboard connected to the latter in the same direction and adjustably mounted, and a VDU. The configuration of the VDU workstation can be changed in response to an impact-type force. In particular, the degree of extension of the VDU workstation in the longitudinal direction of the vehicle can be reduced, specifically by breaking up the VDU workstation into smaller, less bulky parts along predetermined separation points or by defined displacement of individual components in respect of one another. In an advantageous embodiment, the VDU workstation is connected and supported in its operating position by engaging and/or energy-absorbing connecting means, and can be broken up in the case of an impact by the disengagement or energy-consuming deformation of such connecting means. The achievement of a non-bulky and thus less dangerous position of the VDU is also facilitated by the special design of the base part. The danger of injury is further reduced by rounded design of individual elements, upholstering, splinter-protection covering of the viewing surface of the VDU as well as by special design of the keyboard.

According to the invention, the computing unit can also be installed spatially separated from the aforementioned parts, and, the mass of elements close to the user can thus be reduced to minimum so that injuries are prevented to a very great extent.

In this context, it may be seen as a further advantage that the components of the VDU workstation require less space than a conventional lap top personal computer with additional fold-out table and are thus easier to stow away in the back rest of a vehicle seat.

Other objects, advantages and novel features of the present invention will become apparent from the following detailed description of the invention when considered in conjunction with the accompanying drawings.

DETAILED DESCRIPTION OF THE DRAWINGS

Figure 1:
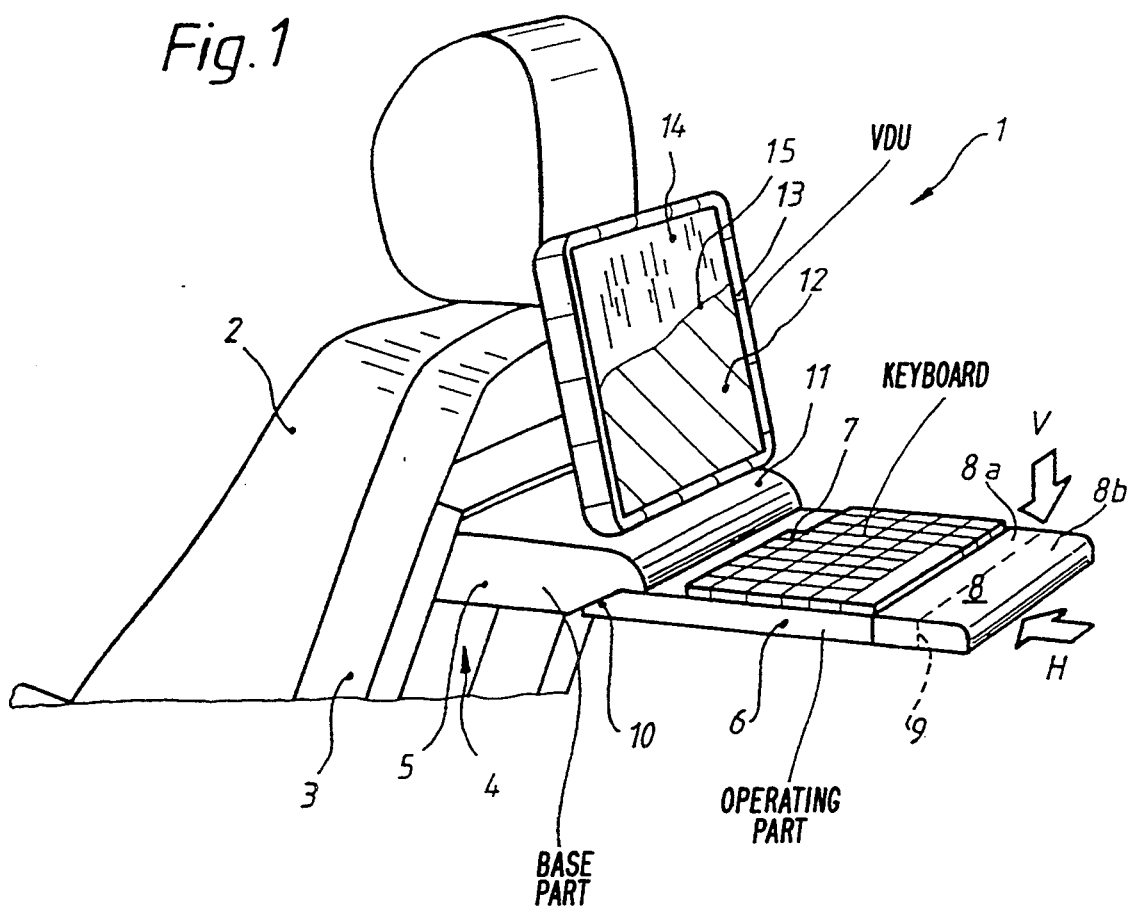
FIG. 1 shows a perspective view of a VDU workstation according to the invention mounted onto the back rest of a vehicle seat.

Referring to FIG. 1, the VDU workstation 1, mounted by way of example on a vehicle seat and disposed forward of the user's seat (not shown) comprises at least figuratively illustrated components, namely the base part 5, the operating part 6 with keyboard 7 fitted therein and a VDU 12.

A computing unit which electrically connects the keyboard 7 and the VDU 12 to one another is not illustrated here. According to the invention, this computing unit can be accommodated either in the back rest 2 or in an adjacent space of the vehicle. An associated mass data memory with mobile medium, for example in the form of a floppy disk drive can also be accommodated there or in another suitable location accessible to the user.

A hand rest 8 mounted in the front of the keyboard may constitute a fourth figuratively illustrated part of the VDU workstation 1.

The VDU workstation 1 is mounted and supported here for example in the rear shell 3 of the back rest 2 of a vehicle seat in such a way that it engages in an operating position or is arrested therein, and when not in use can be lowered into a corresponding stowing recess 4 of the rear shelf 3 of the back rest 2.

In this arrangement, the base part 5 serves as carrier both of the operating part 6 and of the VDU 12. In comparison with the fold-out table which fulfills the corresponding function of the known solution, the base part 5 extends only over a part of the extension of the VDU workstation in the direction of the user, in practice preferably in the longitudinal direction of the vehicle.

Figure 2A:
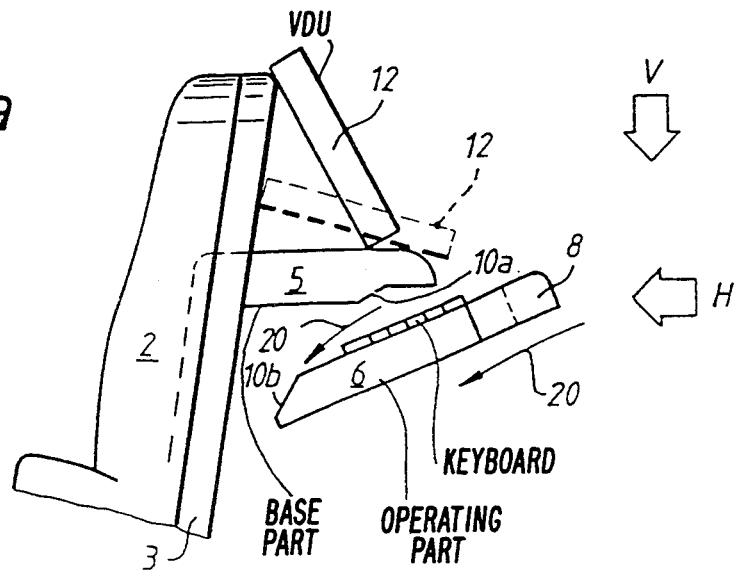
FIG. 2a shows a side view of the VDU workstation in the process of breaking up due to forced separation as a result of the action of an impact-specific force.
Figure 2B:
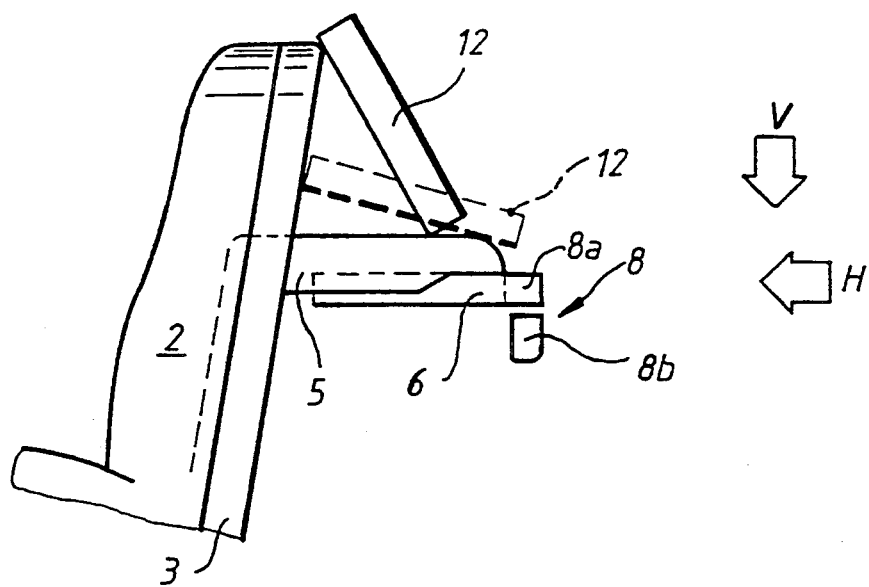
FIG. 2b shows a side view of the VDU workstation in disassembled state as a result of guided or articulated breaking up after the action of impact-specific force.

The connecting zone 10 between base part 5 and operating part 6 is designed in such a way that when it is impacted by a force which exceeds a specific load limit, the operating part 6 can be displaced away from the user in the direction of the arrow V and/or H. This displacement is achieved either according to FIG. 2a or FIG. 2b. In FIG. 2a, the operating part 6, which is initially connected integrally to the base part 5, is adapted to disconnect irreversibly from the base part 5 in the connecting zone 10; by means of guiding forces between the separating faces 10a and 10b becoming effective during the separation process operating part 6 may assume a position below said base part, in the direction of the movement arrows 20. Alternatively, as shown in FIG. 2b, the operating part 6 can dip away under the base part 5 or can be at least partially received by the latter by means of suitable locking and/or articulating means.

In order to minimize the possibilities or injury when the user is subjected to an impact, the base part 5, and in particular its end 11 pointing towards the user, are rounded off, and are also of elastically upholstered design. Further for the purpose of absorption of energy when its specific load limit is exceeded, the base part 5 can be designed to deform into itself in a defined manner.

The keyboard 7 of the operating part 6 advantageously comprises keys of soft rubber which can be covered with an additional film. An integral membrane keyboard may be used equally well.

The VDU 12 is connected to the base part 5 in such a way that it can be swivelled out of a rest position on the operating part 6, for example, in the back rest 2, (which is also its stowing position) into a more or less upright or backwardly inclined reading position for optimum viewing. The VDU 12 is finished in such a way that its rear side can be used as a table surface when it is in its rest position on the operating part 6.

The swivel mechanism (not shown) is preferably designed in such a way that the VDU 12 can be swivelled back in the event of an impact—depending on the direction in which a body part of the user strikes it—on the one hand out of the aforesaid rest position into a position of maximum tilt—as far as the back rest 2, for example—or can be detached or in particular disengaged, at its swivelable bearing mount from the base part 5.

The swivel mechanism can furthermore permit the VDU 12 to be pushed away in the event of an impact—starting from the rest position on the operating part 6, and thus in its previous use as a table surface—along the end face 11, of the base part 5 (which is of oblique design for this purpose), and thus can be superposed on said base part, as illustrated in broken lines in FIGS. 2a and 2b.

In the configuration as a table, a high degree of protection against accidents is provided by elastic upholstering of all components as well as by disengagement and dipping away of the operating part 6 and displacement or disengagement of the VDU 12 due to the effect of a defined and impact-specific, abrupt horizontal or vertical force.

The VDU 12 can contain a flat display element on an LCD or plasma basis, and has in either case a plane viewing face 14, which is preferably covered by means of a tough, sealed or bonded plastic film 15 so as to provide protection from splinters in the event, for example, of a head impact on the viewing screen 14 of the VDU 12. In addition, the plastic film 15 may also have reflection-reducing properties. In order to minimize the possibility of injury, the VDU 12 is also surrounded by a soft or upholstered frame 13 with large rounding-off radii.

The hand rest 8 mounted in front of the operating part 6 is also designed to protect the user from injury in the case of an impact. That is, the hand rest 8 may be constructed in such a way that it is elastically or plastically deformable by an impact specific vertical and/or horizontal force in the load arrow direction V and/or H, thus reducing the impact face pressure along its edges facing the user (and if appropriate, moving downwards and away). Alternatively the hand rest may be so constructed that a first part 8b of the hand rest, facing towards the user changes it position along a separating zone 9 in a defined manner relative to the second part 8a of said hand rest adjoining the operation part 6, and can be displaced away from the user, preferably downwards. In order to facilitate the latter change in configuration, covered articulation and/or engaging means can be provided along the separating zone 9 as connecting elements between the two parts of the hand rest. In addition, connecting elements may be used which deform in a predetermined manner whilst consuming impact energy, thus assuring the desired configuration change. Within the scope of the invention, such elements can also of course be used to bring about an articulated or guided displacement of the operating part 6 in relation to the base part 5.

The hand rest 8 is manufactured either predominantly or only on the surface from a soft-elastic material, for example a plastic structured foam with a preferably closed-pore surface.

In addition to being mounted or supported, a vehicle seat as illustrated by way of example, the described VDU workstation may of course, also be provided in front of a seat on any desired supported component extending in a plane of the passenger compartment of a vehicle, without departing from the scope of the invention.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Video display unit workstation in a vehicle comprising a video display unit, a keyboard arranged on an operating part, and a computing unit connecting said video display unit and said keyboard to one another electrically, said video display unit and keyboard being supported by a base part which, in an operating position of the video display unit workstation, projects approximately horizontally from a supporting part and extends in the direction of a user seat, said video display unit being moveable from an upright reading position into a flat storage position, wherein;

in said operating position, the base part extends over only a part of the video display unit workstation in the direction of the user seat, and the operating part containing the keyboard adjoins the base part, extending away from the latter in the direction of the user seat;

said base part is displacable as a unit together with, and in fixed spacial relationship to, said operating part and said video display unit between a stowed position and said operating position, from which said video display unit is movable into said upright reading position;

said operating part is adapted to be displaced in a defined manner which is one of: below the base part and at least partially into the base part, in response to an impact-specific horizontal or vertical force when said video display unit workstation is in the operating position, whereby the overall extension of said base part and operating part in the direction of the user can be shortened as a whole; and said video display unit is adapted to be superposed on the base part when an impact specific force is applied thereto.

2. Video display unit workstation according to claim 1, wherein said base part and operating part are connected to form a normally rigid unit, with a predetermined separating zone disposed between both of said parts, said separating zone including guide faces constructed on the base part and on the operating part, and being adapted to separate and displace the operating part in a defined manner below the base part, whereby the mutual interaction of said guide faces in the course of a separation of the base and operating part, causes the defined displacement of the operating part below the base part.

3. Video display unit workstation to claim 1, wherein base part and operating part are connected to form a normally rigid unit, with coupling means connecting both of said parts and being adapted to bring about an articulated or guided displacement of the operating part in a predetermined manner below the base part; and wherein said displacement comprises a translatory movement of said operating part away from said operator into a position which substantially corresponds to said storage position.

4. Video display unit workstation according to claim 3, wherein one or more of said articulating, engaging or connecting means are of energy-absorbing design.

5. Video display unit workstation according to claim 1, wherein a hand rest is mounted at the front of keyboard, which hand rest is manufactured essentially from an elastic or plastically deformable material, in particular a foam material.

6. Video display unit workstation according to claim 5 wherein the hand rest has a separating zone dividing it into two parts, and articulating or engaging connecting means are provided which keep said two parts of the hand rest in an essentially level configuration adjacent to one another, such connecting means being adapted only to permit a downwards displacement of the part of the hand rest on the user side when an impact-specific horizontal and/or vertical force applied thereto.

7. Video display unit workstation according to claim 6, wherein one or more said articulating, engaging connecting means are of energy-absorbing design.

8. Video display unit workstation according to claim 1, wherein the base part has an end of oblique construction pointing towards the user, said end being adapted to bring about a sliding super positioning of the video display unit, previously resting on the operating part, and of the base part when at least one impact-specific horizontal force is received.

9. Video display unit workstation according to claim 1, wherein the base part is design to be rounded off and without salient edges.

10. Video display unit workstation according to claim 1, wherein the base part is designed to be deformable in a predetermined manner under the effect of the absorption of energy.

11. Video display unit workstation according to claim 1, wherein a surface of the video display unit is constructed in such a way that it can be used as a table surface.

12. Video display unit workstation according to claim 1, wherein a viewing face of the video display unit is covered with a tough film having sufficient tensile strength to hold splinters together, and further adapted to act as a reflection-reducing medium.

13. Video display unit workstation according to claim 1, wherein the video display unit has a circumferentially rounded-off upholstered or soft frame.

14. Video display unit workstation according to claim 1, wherein the keyboard is designed as one of: an integral membrane keyboard or with individual keys, the key heads of which consist predominantly of soft rubber.

15. Video display unit workstation according to claim 1, wherein the computer unit is arranged in a location which is spatially remote from the operating part bearing the keyboard, and from the video display unit.

16. Video display unit workstation according to claim 1, wherein a storage device, belonging to the computing unit, for a mobile storage medium, is provided spatially remote from the operating part and the video display unit, in space accessible to the user.

17. Video display unit workstation according to claim 1, wherein when the video display unit is positioned on the operating part the video display unit workstation can be lowered by means of a suitable bearing or guiding of at least its base part in a stowage recess of the supporting part.

18. Video display unit workstation according to claim 17, wherein the supporting part is a vehicle seat and the stowage recess is arranged in the rear shell of the back rest of the vehicle seat.

19. Video display unit workstation according to claim 1, wherein said video display unit is detachable from the base part for the purpose of superposing the base part and video display unit on top of one another.

20. Video display unit workstation in a vehicle comprising a video display unit, a keyboard arranged on an operating part, and a computing unit connecting said video display unit and said keyboard to one another electrically, said video display unit and keyboard being supported by a base part which, in an operating position of the video display unit workstation, projects approximately horizontally from a supporting part and extends in the direction of a user seat, said video display unit being moveable from an upright reading position into a flat storage position, wherein;

in said operating position, the base part extends over only a part of the video display unit workstation in the direction of the user seat, and the operating part containing the keyboard adjoins the base part, extending away from the latter in the direction of the user seat;

said operating part is adapted to be displaced in a defined manner which is one of: below the base part and at least partially into the base part, in response to an impact-specific horizontal or vertical force when said video display unit workstation is in the operating position, whereby the overall extension of said base part and operating part in the direction of the user can be shortened as a whole; and said video display unit is adapted to be superposed on the base part when an impact specific force is applied thereto.

* * * * *